Feb. 6, 1934. P. H. CHASE ET AL 1,945,594
METHOD OF AND APPARATUS FOR MANUFACTURING TUBING
Filed Nov. 23, 1929 9 Sheets-Sheet 1
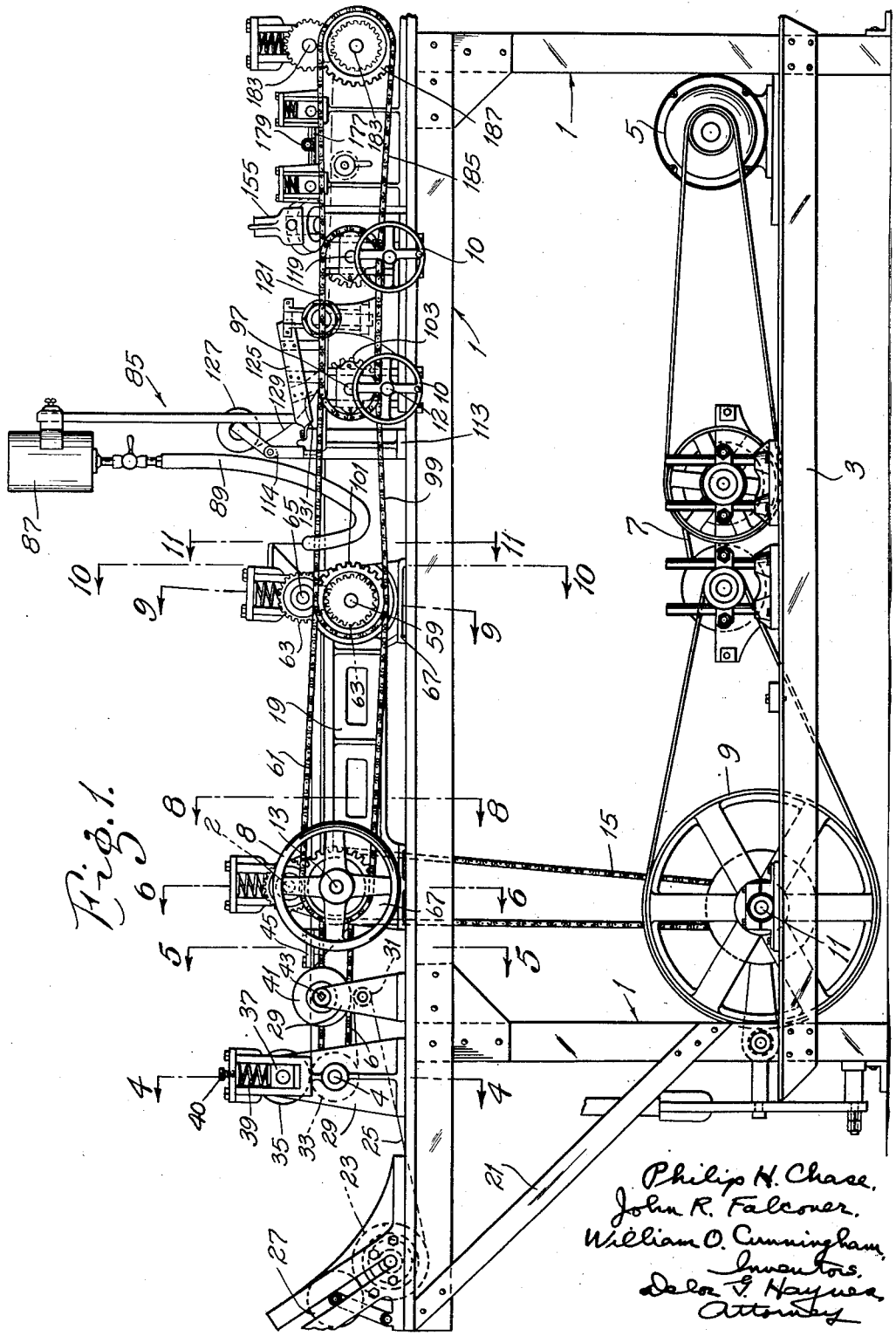

Feb. 6, 1934.  P. H. CHASE ET AL  1,945,594
METHOD OF AND APPARATUS FOR MANUFACTURING TUBING
Filed Nov. 23, 1929  9 Sheets-Sheet 2
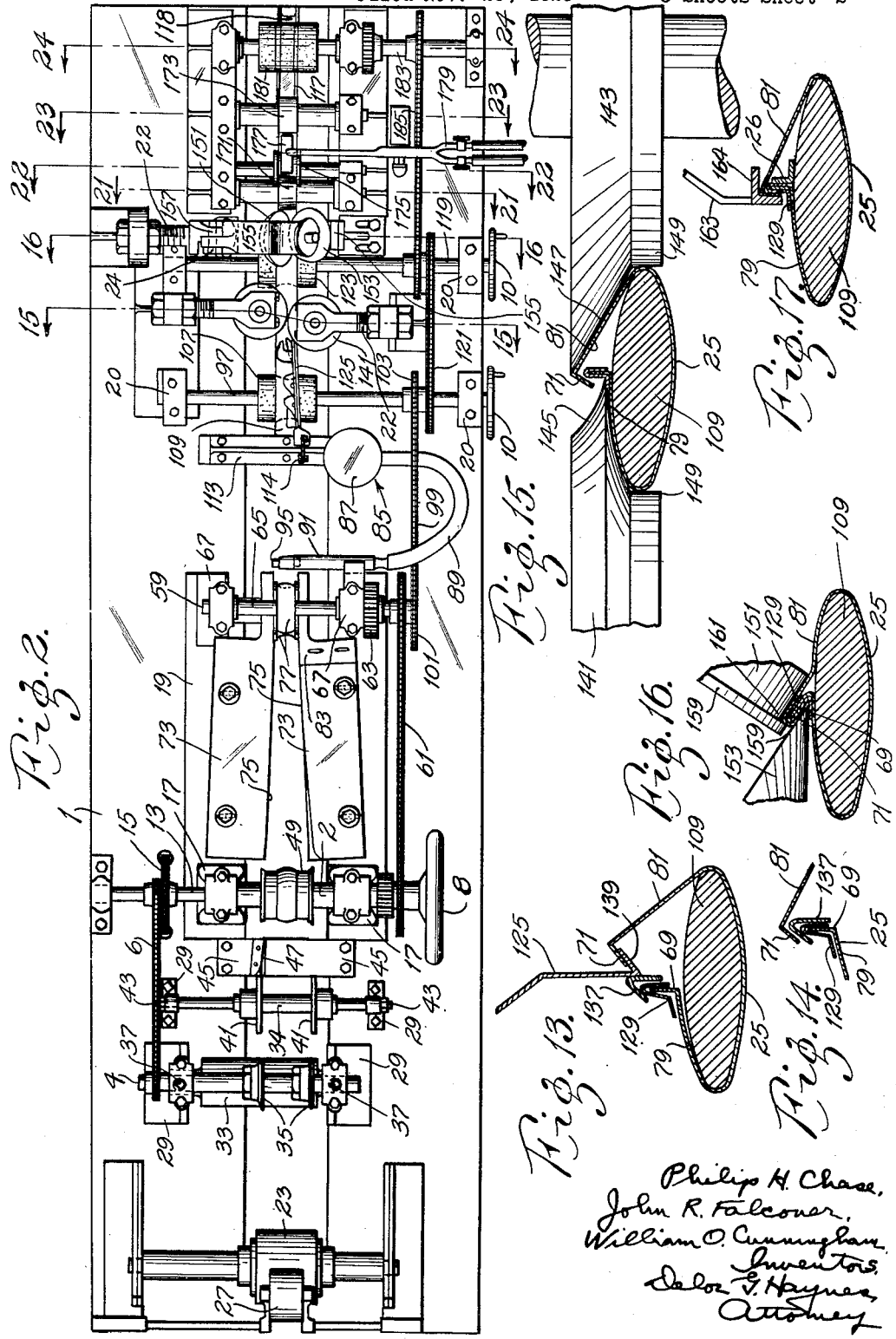

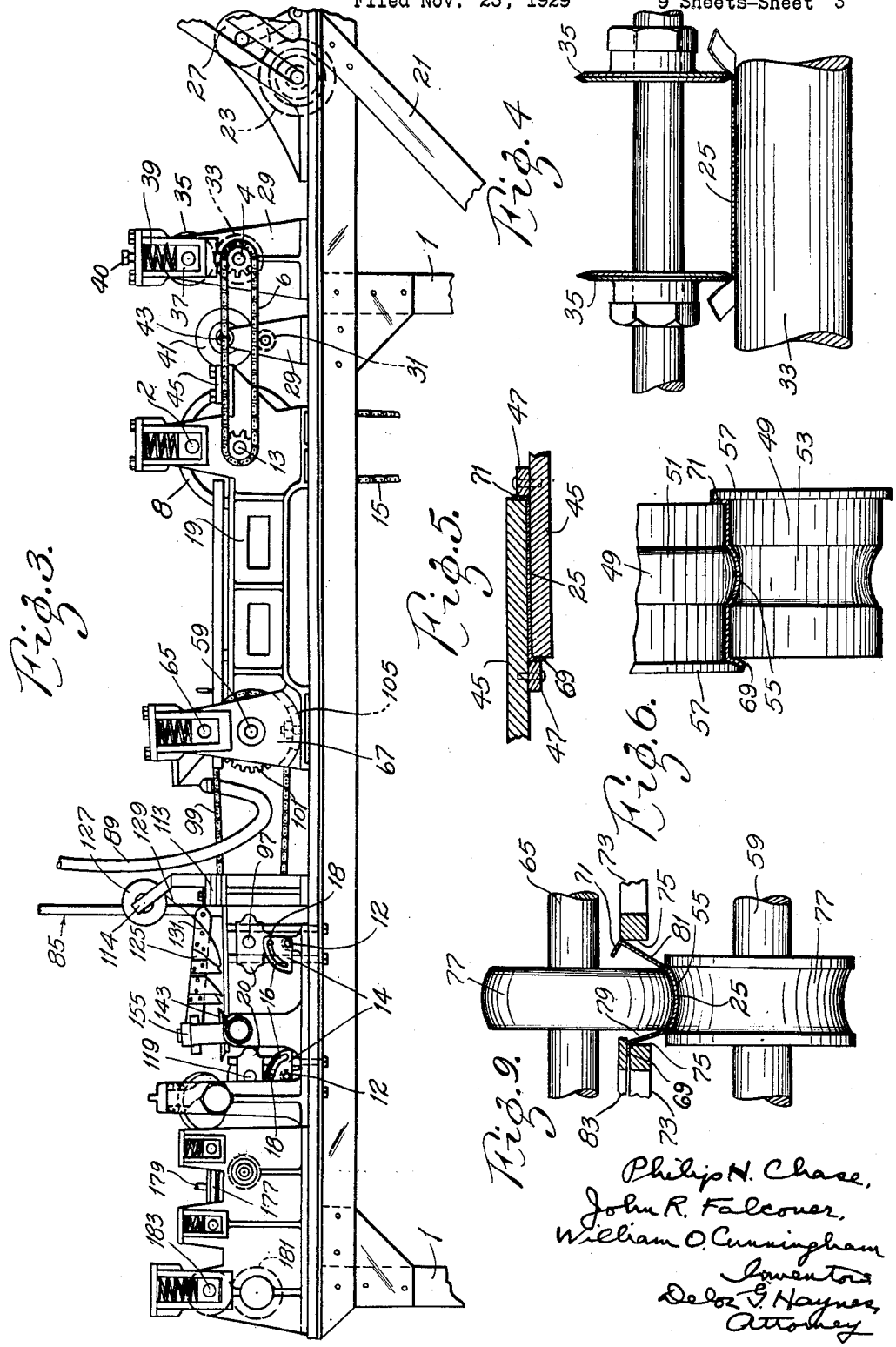

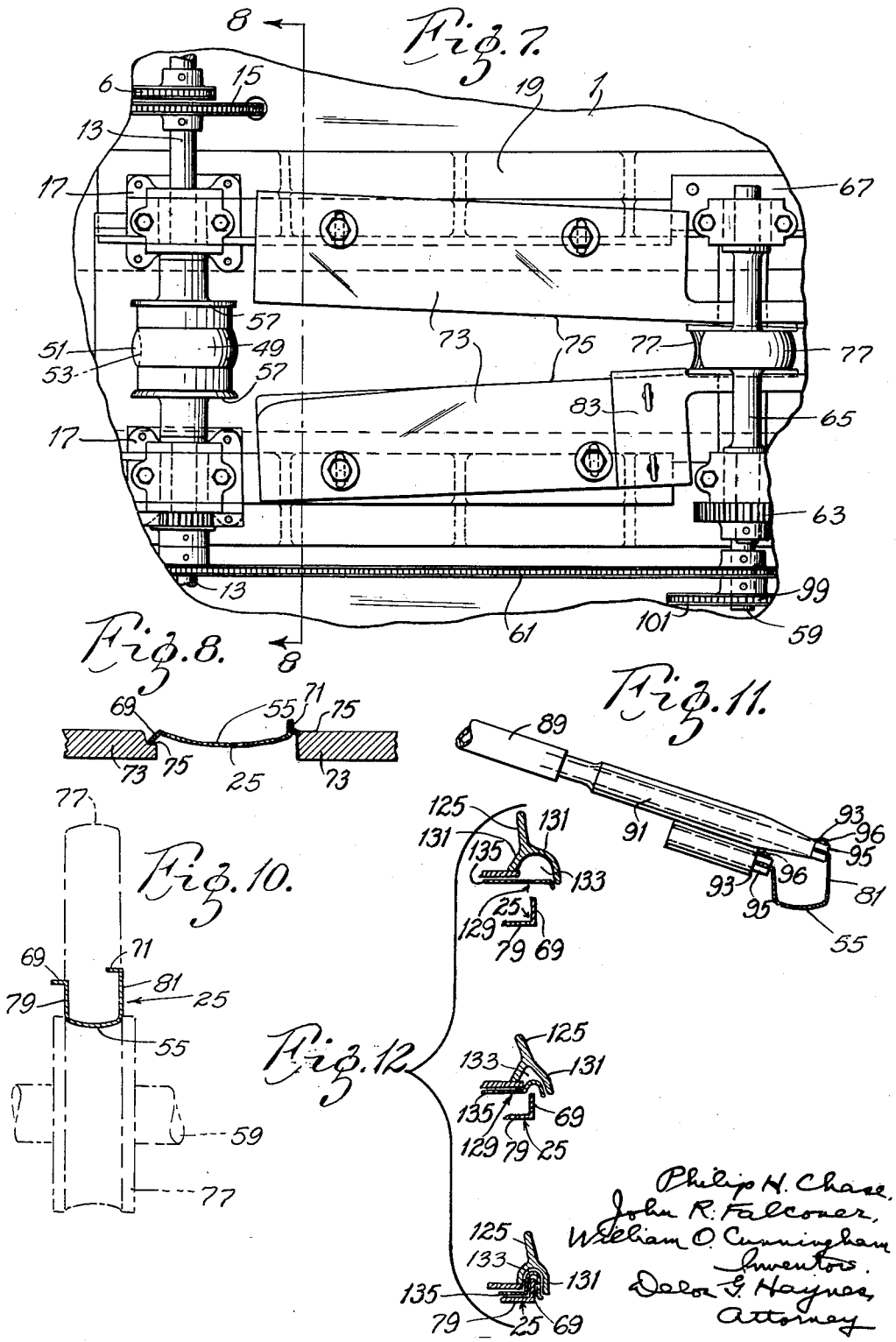

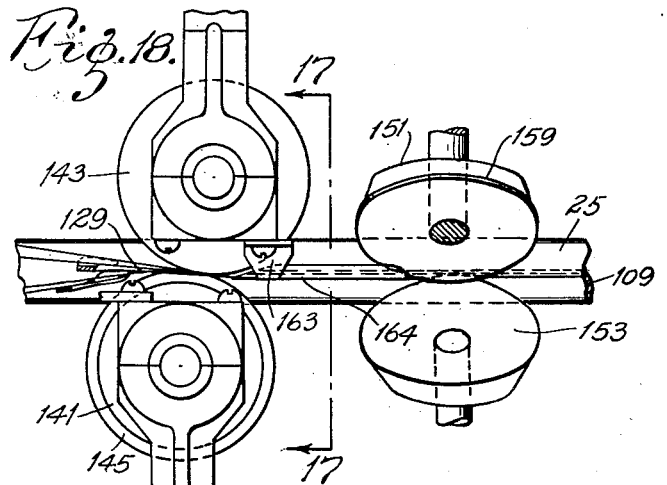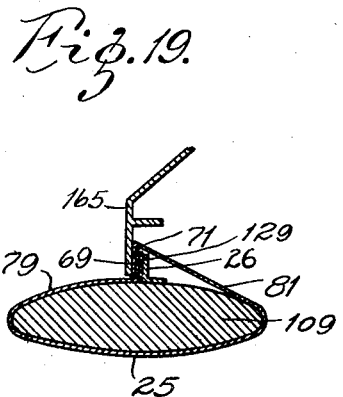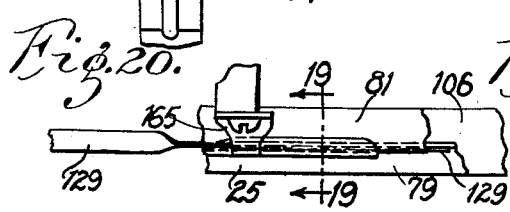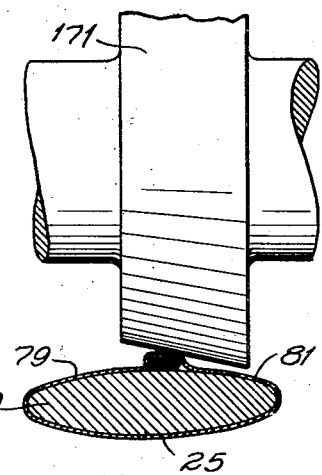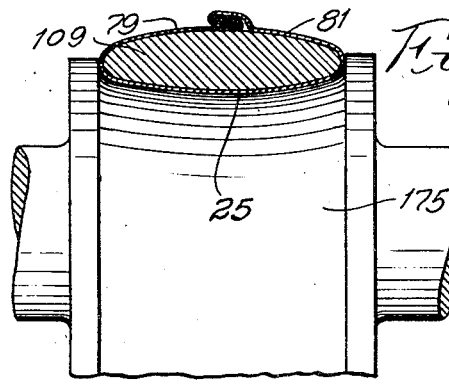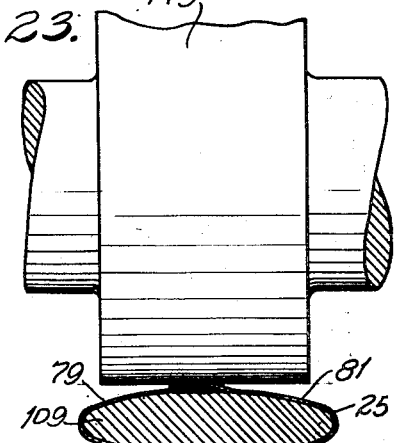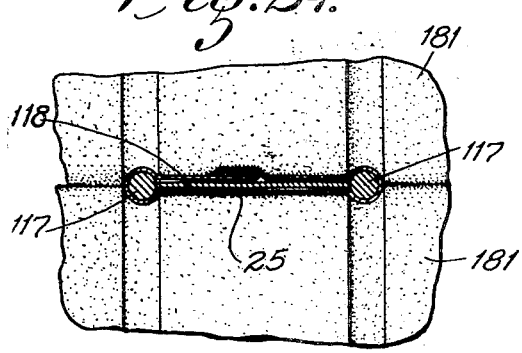

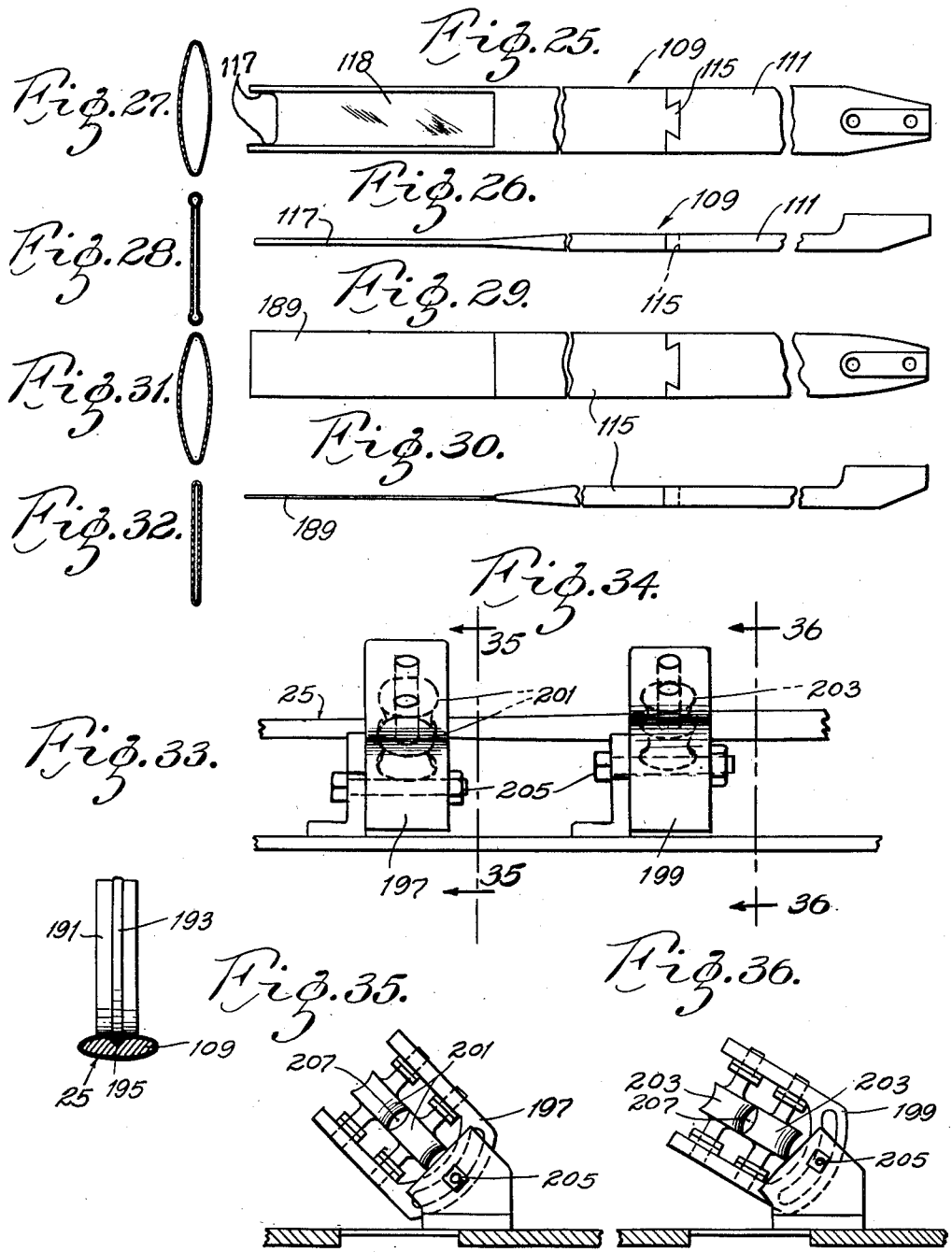

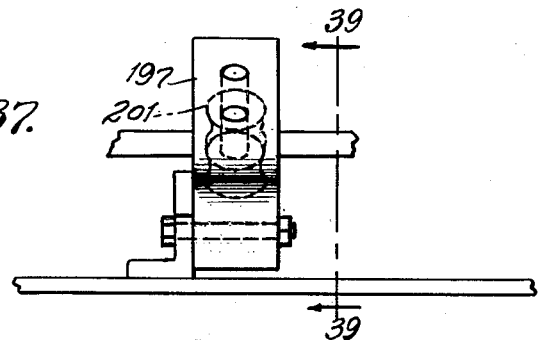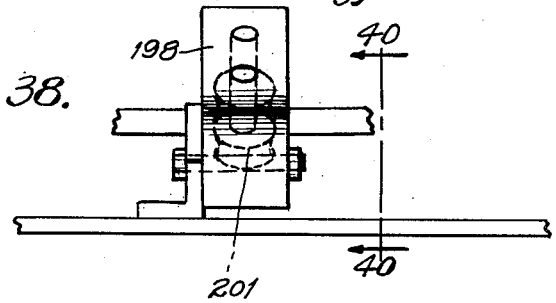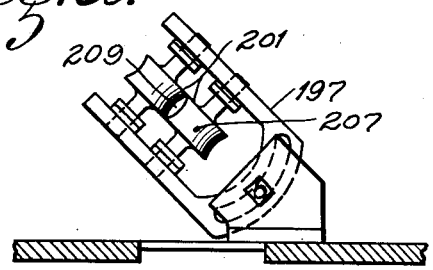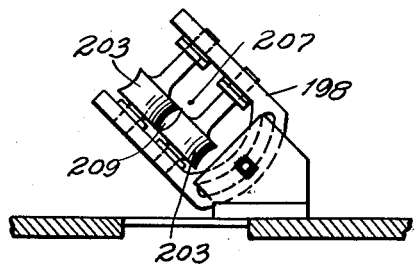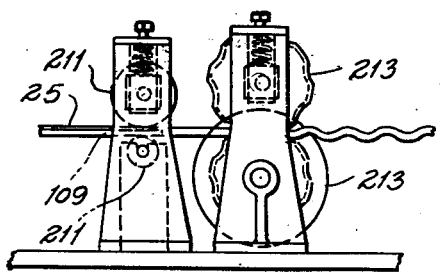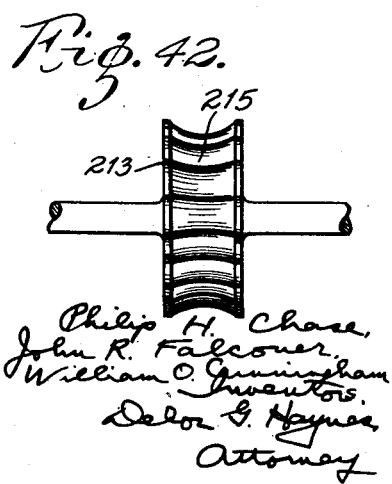

Feb. 6, 1934.  P. H. CHASE ET AL  1,945,594
METHOD OF AND APPARATUS FOR MANUFACTURING TUBING
Filed Nov. 23, 1929   9 Sheets-Sheet 8

Philip H. Chase
John K. Falconer
William O. Cunningham
Inventors.
Delos G. Haynes
Attorney Feb. 6, 1934.   P. H. CHASE ET AL   1,945,594
METHOD OF AND APPARATUS FOR MANUFACTURING TUBING
Filed Nov. 23, 1929   9 Sheets-Sheet 9
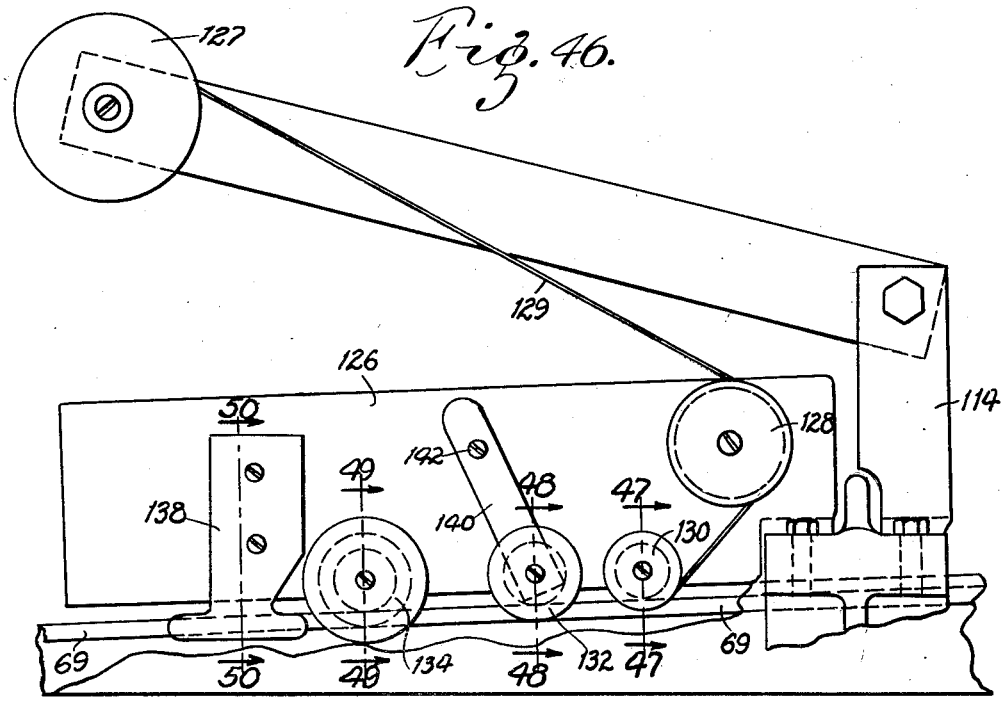
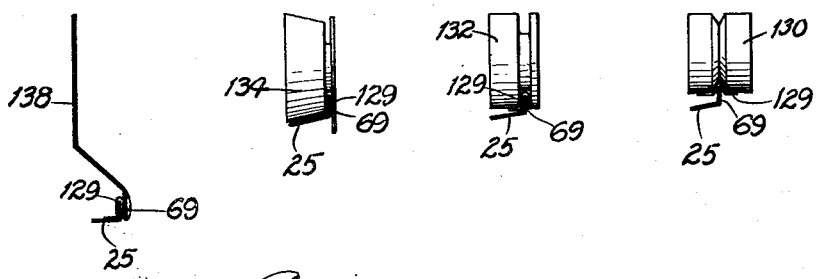
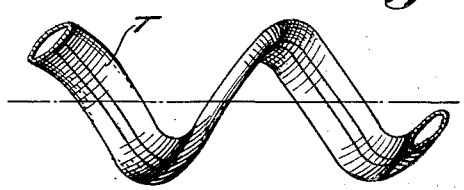

Patented Feb. 6, 1934

1,945,594

UNITED STATES PATENT OFFICE

1,945,594

METHOD OF AND APPARATUS FOR MANUFACTURING TUBING

Philip H. Chase, Bala-Cynwyd, John R. Falconer, Conshohocken, and William O. Cunningham, Pottstown, Pa.; said Falconer and said Cunningham assignors to said Chase Application November 23, 1929
Serial No. 409,269

13 Claims. (Cl. 113—34)

This invention relates to method of, and apparatus for, manufacturing tubing for use in cables and the like, and with regard to certain more specific features to a method of, and apparatus for, manufacturing thin walled tubing.

Among the several objects of the invention may be noted the provision of means for continuously forming locked seam tubing from a thin sheet metal strip; the provision of means of the class described which permits the metal strip to assume its final form without setting up deleterious stresses and/or strains which would otherwise tend to effect a weak and distorted product; the provision of means of the class described including sealing and annealing means; and the provision of means of the class described adapted to produce continuous, indefinite lengths of tubing of various shapes at high rates of speed with minimum complications and expense. Other objects will be in part obvious and in part pointed out hereinafter.

The invention accordingly comprises the elements and combinations of elements, features of construction, and arrangements of parts which will be exemplified in the structure hereinafter described, and the scope of the application of which will be indicated in the following claims.

In the accompanying drawings, in which are illustrated several of various possible embodiments of the invention, Fig. 1 is a left side elevation of one form of the machine;

Fig. 2 is a plan view of Fig. 1;

Fig. 3 is a fragmentary right-side elevation of the machine;

Fig. 4 is an enlarged section taken on line 4—4 of Fig. 1, illustrating a first trimming operation;

Fig. 5 is an enlarged cross section taken on line 5—5 of Fig. 1, illustrating a second operation of flanging;

Fig. 6 is an enlarged cross section taken on line 6—6 of Fig. 1, illustrating a third operation of bulging a portion of the tubing;

Fig. 7 is a fragmentary enlarged plan view illustrating certain converging curling guide plates, no strip material being shown in position;

Figure 44:
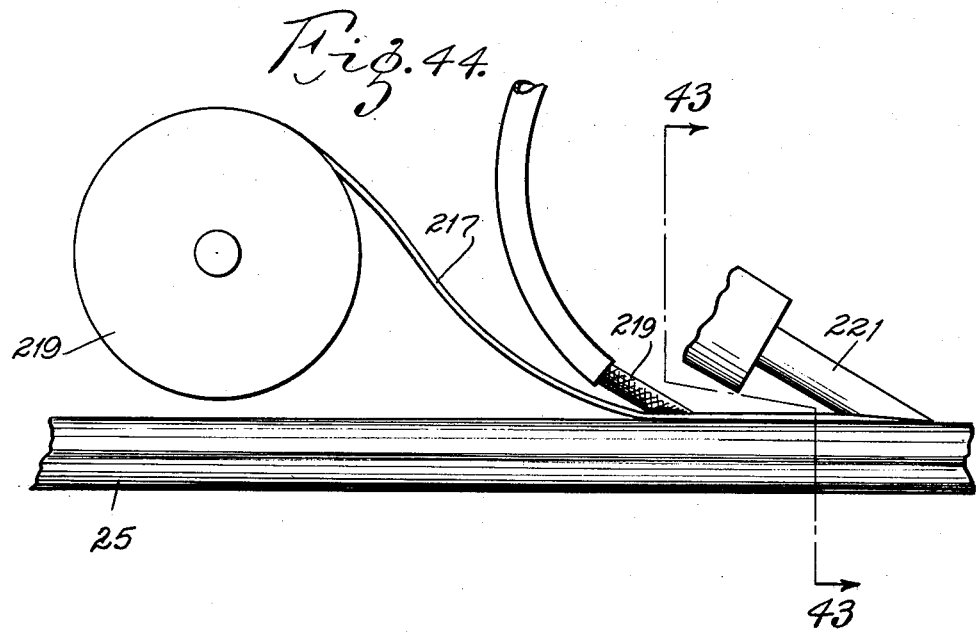
Figure 43:
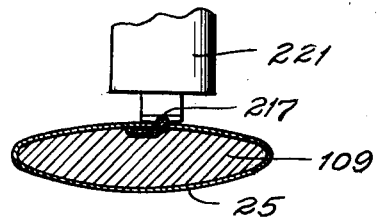
Figure 45:
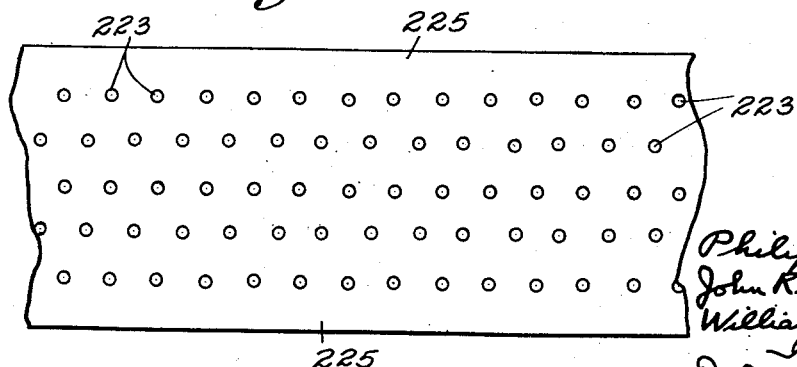

Fig. 8 is an enlarged cross section taken on line 8—8 of Figs. 1 and 7, illustrating the action of the material during passage through said curling guide plates, but it is to be noted that in Figs. 1 and 7 no material is shown;

Fig. 9 is an enlarged cross section taken on line 9—9 of Fig. 1 illustrating an approach of material to certain bending rolls;

Fig. 10 is an enlarged cross section taken on line 10—10 of Fig. 1, illustrating a fourth and bending operation;

Fig. 11 is a cross section taken on line 11—11 of Fig. 1, illustrating the application of a flux to certain flanges comprising a fifth operation;

Fig. 12 is a series of cross sections of a solder applying shoe illustrating successive operations during passage of a strip of material through the shoe;

Fig. 13 is a view similar to, but taken beyond Fig. 12, showing a seventh tube closing operation;

Fig. 14 is a fragmentary view similar to Fig. 13 showing a continuation of said seventh operation;

Fig. 15 is a view similar to Fig. 14 showing a further continuation of said seventh operation and also represents a cross section taken on line 15—15 of Fig. 2;

Fig. 16 is a view similar to Fig. 15 illustrating an eighth and double seaming operation and represents a cross section taken on line 16—16 of Fig. 2;

Fig. 17 is a view similar to Figs. 15 and 16 illustrating the method of manipulating the material between the operations of Figs. 15 and 16, and comprises a cross section taken on line 17—17 of Fig. 18;

Fig. 18 is a fragmentary plan view of Fig. 17; this figure also showing section lines 17—17 upon which Fig. 17 is based;

Fig. 19 is a view similar to Fig. 17 showing an alternative wherein is used a single strip of solder, the view being taken substantially along line 19—19 of Fig. 20;

Fig. 20 is a plan view on a reduced scale of Fig. 19;

Fig. 21 is a cross section similar to Fig. 12 showing a pre-rolling operation and is taken substantially along line 21—21 of Fig. 2;

Fig. 22 is a cross section taken on line 22—22 of Fig. 2;

Fig. 23 is a cross section taken on line 23—23 of Fig. 2;

Fig. 24 is a cross section taken on line 24—24 of Fig. 2;

Fig. 25 is a plan view of a mandrel;

Fig. 26 is a side elevation of Fig. 25;

Figs. 27 and 28 are diagrams illustrating the action of the tubing on the mandrel of Figs. 25 and 26;

Figs. 29, 30, 31 and 32 are views corresponding to Figs. 25-28 respectively showing an alternative form of mandrel;

Fig. 33 is a cross section illustrating a modified form of seam-compressing roller and mandrel;

Fig. 34 is a diagrammatic side elevation showing means for producing a helical tube;

Figs. 35 and 36 are cross sections taken on lines 35—35 and 36—36 respectively of Fig. 34;

Figs. 37 and 38 are views similar to Fig. 34;

Figs. 39 and 40 are cross sections taken on lines 39—39 and 40—40 of Figs. 37 and 38 respectively;

Fig. 41 is a side elevation showing an alternative means of handling the tubing as it is delivered from the machine;

Fig. 42 is an edge view of one of the fluted rolls shown in Fig. 41;

Fig. 43 is a cross section taken on line 43—43 of Fig. 44 illustrating another form of the invention;

Fig. 44 is a side elevation of Fig. 43;

Fig. 45 is a plan view showing another form of material which may be used;

Fig. 46 is an enlarged side elevation showing an alternative feature of the invention;

Figs. 47 to 50 are cross sections taken on lines 47 to 50 respectively on Fig. 46; and Fig. 51 is a side elevation illustrating a helicoidal tube form.

It will be noted that the section lines on Figs. 1 and 2 indicate that the reader is consistently viewing these sections from the delivery end of the machine.

Similar reference characters indicate corresponding parts throughout the several views of the drawings.

Referring now more particularly to Fig. 1, there is illustrated at numeral 1 a supporting frame carrying a sub-structure 3 upon which is located a driving motor 5 belted to a speed changing device 7, the latter being in turn belted to a pulley 9 attached to a jack shaft 11. The speed changing device 7 is provided with suitable manual adjusting means for speed changing purposes, whereby it is made possible to vary the rate of operation of the machine to be described therein. The jack shaft 11 is connected by means of a chain drive 15 with a main drive shaft 13 (see also Fig. 2). The main shaft 13 is supported upon a superstructure 19 by suitable brackets 17.

Rearwardly of the superstructure 19 is provided a support 21 for carrying a supply roll 23 of strip material. The material comprises a metallic strip of suitable thinness such as, for instance, copper having a thickness of the order of three thousandths of an inch, and a width of approximately two and a half inches, although it is not intended that these exemplary figures be limiting. The strip which is drawn from the supply roll 23 is indicated by numeral 25 where shown in the drawings. In order that suitable tension may be maintained on the strip 25 as it is drawn from the roll 23, there is provided a gravity operated idler wheel 27 which rides on said roll 23. This idler 27 also prevents the strip from losing its tension on the roll itself.

*First or cutting operation*

Located forwardly of the strip 25, on the superstructure 19 are a group of brackets 29 carrying, first, a lower flanged guide roll 31 with laterally adjustable flanges thereon, second, a hardened steel roll 33 over which the strip 25 is drawn (see also Fig. 4). Bearing upon the strip as it passes over the roll 33 is a pair of hardened, steel, circular cutters 35 supported in bearings 37. The bearings 37 are mounted slidably in a pair of said brackets 29, being pressed into cutting engagement with the strip 25 by a set of pressure springs 39 and/or adjustive screws 40. The roll 33 is mounted on a cutter shaft 4, driven by a chain 6 from the main shaft 13. This cutting operation will be referred to hereinafter as the first operation. The purpose of the cutting operation is to trim the strip 25 to an accurate dimension and to provide a relatively smooth edge thereon. It may be eliminated if the strip is of proper width and accuracy before application to this machine.

*Second or flanging operation*

From the cutting operation the strip 25 is drawn through an upper guide roll 34 with laterally adjustable guide flanges 41 mounted thereon (see Figs. 1 and 2). Each guide flange 41 has a flat face which engages an edge of the strip to maintain strip alignment. As illustrated in Fig. 2, lateral adjusting means 43 permit lateral adjustment of the upper guide roll 34.

Mounted forwardly of the guide roll 34 is a set of spaced adjustable flanging plates 45. These plates are spaced apart a distance substantially equal to the thickness of the strip of material. The juxtaposed faces of the plates 45 (see Fig. 5) have less width than the strip of material itself, thereby providing a free edge on the strip which is adapted to be turned up on one side and down on the other against flanging strips 47. These strips are placed at the ends of the plates and are so curved and shaped that they lead the said free edge of the strip into the flanged positions illustrated in said Fig. 5. This action comprises the second operation herein.

*Third flanging or bulging operation*

From the flanging plates the strip of material 25 is led between cooperating surfaces of flanging rolls 49 one of which is located on said main shaft 13 and the other of which is on a geared counter shaft 2. They have juxtaposed cylindrical forms comprising a male portion 51 and a female portion 53 adapted to force a strip of material to assume a cradle or bulged shape 55 such as is illustrated broadly in Fig. 6. The flanging rolls 49 preferably have a higher peripheral speed than the cutter roll 33.

Alternately opposite ends of the rolls 49 are plane faced and the other alternate ends are flanged, as indicated at numeral 57 (Fig. 6), for engagement with said plane faces, in order to maintain the flange shape of the strip 25 as the cradle or bulge is put into the center of the same. This is the third operation and will be referred to herein as the bulging operation.

*Fourth or curling operation*

Located some distance forwardly of the main shaft 13 is a counter shaft 59 connected with the main shaft 13 by means of a suitable sprocket-and-chain drive 61, the connection being at a one to one speed ratio. This shaft 59 is connected by means of gears 63 to an upper shaft 65. This gearing is also of a one to one ratio. The brackets 67 in which the shafts 59 and 65 are borne are tilted, so that the center line drawn between said shafts 59, 65 slopes downwardly and rearwardly for purposes which will be made clear. The degree of tilt is adjustable as indicated by the bolted arcuate mounting 105 (Fig. 3). Shafts 59 and 65 carry forming rolls 77 of juxtaposed male and female forms (not unlike the central portions of rolls 49) adapted to increase the said bulge placed in the material by rolls 49, and to aid in effecting a U-shape therein, as illustrated in Figs. 9 and 10.

The initial U-shape is effected by the curling and edge-guiding plates 73. The forwardly located shaft 59, as illustrated in Fig. 1, is located below the main shaft 13, so that the strip of material 25 is drawn downwardly as it passes between the converging edges 75 of the curling plates 73. Thus in drawing the strip downwardly the legs 79 and 81 thereto are bent upwardly (see Fig. 9). This comprises the fourth or curling operation.

Fig. 9 illustrates how the leg 81 is caused to be made longer than the leg 79 by having one plate at a slightly higher elevation than the other and providing a guide 83 on the plate of lower elevation. As illustrated in Figs. 2 and 9, the converging carrying plates 73 are laterally and vertically adjustable as well as is the guide 83.

Fifth or fluxing operation

After passing from the forming rolls 77 the U-shaped strip passes through a flux applying device 85 which comprises a supply tank 87 connected by a hose 89 with a nozzle 91 having two openings 93 (see Figs. 1 to 3 and 11) from which extend pairs of wicks 95, suitably pressed by springs 96 to engage the flanges 69 and 71 passing between the members of the pairs of wicks 95. The application of the flux, as described, comprises the fifth or fluxing operation herein.

Traction rolls and mandrel

Mounted ahead of the shaft 59 is a shaft 97 which is geared to said counter shaft 59 by way of a chain drive 99. The sprocket 101 located on shaft 59 and comprising part of the chain drive 99 is larger than the corresponding driven sprocket 103 on the shaft 97, thereby causing the shaft 97 to rotate faster than the shaft 59.

The shaft 97 carries a rubber traction roller 107 which is shaped to conform to the bulged lower surface of the U-shaped material at this location. Thus the rubber roller 107, which is operating at a higher peripheral speed than the forming rolls 77, functions as a traction roll for drawing the strip 25 through the devices hereinbefore described. Thus the strip 25 is put into tension and drawn through the primary forming operations, rather than being pushed through, whereby crinkling, bulging and the like is prevented in the material forming the tubing. A rubber roll is used because of the increased friction which is available between its surface and the surface of the strip 25 and because of its ability to better conform to the surface of the material being pulled.

It will be appreciated that in order to obtain the requisite reaction for effecting proper traction, the strip 25 must be backed up by some more or less rigid construction. This construction is provided in the form of an elongated mandrel 109, detailed more in particular in Figs. 25 and 26. This mandrel comprises a body 111 adapted at its rearward end to be held to a cross bracket 113; the bracket 113 spans the width of material 25. This head or body portion 111 fits down into the U-shaped portion of the strip or tape, the legs 79 and 81 of said strip being positioned sidewardly of the body 111 at this point. Forwardly the body 117 carries a dove-tailed horn 115 from which forwardly extend fingers 117. The part which will hereinafter be referred to as the mandrel will include the body 111, the horn 115 and the fingers 117. This mandrel reaches from the bracket 113 to the forward or delivery end of the machine.

An inspection of Fig. 2 shows that there is located forwardly of the shaft 97 another shaft similar thereto, to which the numeral 119 has been applied. This shaft 119 is geared to said shaft 97 by means of a one to one chain drive 121, so that the angular velocity of the shaft 119 equals that of the shaft 97. Or, the velocity of shaft 119 may be made slightly greater than that of shaft 97. This shaft 119 also carries a rubber roller 123 similar in shape and size to said rubber roller 107 and performing a similar tractive function by pressing upon the bottom of the strip of material and drawing the same through the machine with the aid of said roller 107. It is clear that the mandrel 111 also extends rearwardly over said roller 123 to provide suitable reaction to the pressure thereof.

Solder-applying or sixth operation

Above the traction roll 107 and the mandrel 109 is located a tube closing and solder-applying shoe 125. This shoe 125 is suitably fastened and overhangs the mandrel forwardly. Another bracket 114 also supports a roll of strip solder 127, the flat strand 129 of which is led downwardly into a rearward element 131 of said shoe 125 for application to the strip which is being seamed. The application of the solder to the strip of material comprises the sixth operation. Some further bending of the strip of material is required during this operation but the primary bending action takes place thereafter and will therefore be designated as a separate and subsequent operation, referred to hereinafter. This sixth or solder-applying operation is best illustrated in Fig. 12, wherein is shown a series of events during the time that the strip 25 and the length of solder 129 are brought together in the shoe 125.

Referring to said Fig. 12, it will be seen that the rearward portion 131 on the shoe 125 will be seen to comprise on its underside an arch shaped tunnel portion 133 which more closely approaches the now upstanding flange 69 of the tube strip 25 as the machine is traversed from the rear to the front. It will be understood that by the time that the position of Fig. 12 has been reached, the flange 69 and associated legs 79 of the U-shaped portion have been drawn down into a horizontal position by a gathering action of certain parts located more forwardly on the machine (to be described). It will thus be seen (Fig. 12) that the strip of solder 129 is being led downwardly toward the flange 69 by the guide 133 and at the same time is being wedged into a U-shape over said flange 69, thereby at the same time leaving a sidewardly extending leg of solder in cross section, indicated by numeral 135 in Fig. 12. It will be recalled that in Fig. 12, as in the other detail sections, a view is being taken from front to rear of the machine.

It will be seen from the above that the sixth operation results in a face of solder being placed on each side of the upstanding flange 69 and also on the upper side of the strip 25, against which flange 69 the flange 71 will later lie.

In Figs. 46 to 50 is shown an alternative means for effecting the sixth operation in which a roll equipped shoe 126 is substituted for the shoe 125. This shoe 126 includes a guide roll 128 for properly feeding the strip of solder 129 into position under a V-notch roll 130 which serves to preform the solder over the tube flange 69 (see Fig. 47). Next the material passes under a grooved roll 132 for facing both sides of the flange 69 with solder. The roller 132 is swingable on a lever 140 about a center 142 for providing vertical adjustment. After this the solder faced flange 69 passes through a clinching roll 134 which clinches the solder against the sides of the flange. Also, the roll 134 is tapered so that the extending portion of the solder is faced up against the portion of the tube next to the flange (see numeral 136, Fig. 49). A guide 138 is positioned beyond the roll 134 in order to maintain the relationship between materials effected by said rolls.

Seventh or tube closing operation

In Fig. 13 is illustrated the conditions which exist after the sixth operation of applying the solder has been completed. Figs. 13, 14 and 15 illustrate the next and seventh operation. This operation comprises the actual closing in of the legs of the U-shaped strip 25 but excludes the actual rolling shut and sealing shut of the same. In said Figs. 13 and 14 is shown a continuation 137 of the arch 133 which insures that the strip 129 of solder will remain in position on its flange 69. It will be understood that the leg 79 of the strip 25 has now been drawn in completely; whereas the leg 81 thereof has been only partially drawn over by said other parts hereinafter to be described. This partial drawing over is due to the restraining action under the flange 71 of a claw 139 forming a part of the shoe 125.

In Fig. 14 is illustrated the condition after the flange 71 has ridden past the claw 139 and springs down on the outside of said extension member 137, the flange 69 with the formed and applied solder still passing under the member 137. It will be understood that the member 137 has an end which is located forwardly of the machine, and that, as the flanges 69 and 71 pass therefrom, said flanges spring together more or less.

A continuation of the seventh operation is illustrated in Fig. 15 wherein the opposite legs 79, 81 of the now elliptically shaped strip 25 are engaged by guide wheels 141 and 143 respectively. The periphery 145 of the wheel 141 is tapered upwardly to accommodate a depressed position of the flange 71, which flange 71 is at this time depressed by the periphery 147 of the opposite wheel 143. The periphery 147 of said wheel 143 is flared upwardly and outwardly to provide this depressing function as the tape passes between the wheels 141, 143. The lowermost portions of the wheels 141, 143 are formed as collars 149 for maintaining the extremities of the elliptical section of material against the mandrel 109. Thus accurate shaping of the tube is effected as its seam is closed. It will be understood that although an elliptical cylinder of tubing is illustrated that cyindrical forms of other cross sections may be made.

Eighth or double seaming operation

The material 25 passes from the rolls 141, 143 in the condition shown in Fig. 15 and proceeds toward a set of double seaming rolls 151, 153 (see Fig. 16). The rolls 151, 153 are rotatably mounted on sloping gudgeons extending from suitable brackets 155. These brackets are adjustably mounted as indicated at numerals 157. The double seaming rolls 151, 153 and guide wheels 141, 143 are idling rolls and are not driven.

As illustrated in Fig. 16, the roll 153 has a bevelled edge 159 against which the open seam rides so that the flange 71 is tucked against the flange 69, there being said strip of solder 129 therebetween. Cooperating to aid in the tucking operation and further to initiate bending down of the seam, there is provided the edge 161 of the roll 153. This edge 161 has a shape conforming to the general outline of the seam as regards the portions of the seam not engaged by the roll 151. It will be here seen that the flanges, taken in connection with the adjacent portions of the tube material, are being transformed into interlocking U-shapes with the S-shape of solder sinuously positioned therebetween, so that every sealing face between the U-shaped edges is faced with solder. This double seaming operation comprises the eighth operation referred to herein.

Prior to this operation, there is shown a step in Figs. 17 and 18 (not shown in Fig. 2 for clarity), wherein, in its path from the guide rolls 141, 143 to the double seaming rolls 151, 153, the assembled tubing and solder proceeds by way of a guide member 163 which is L-shaped in cross section (Fig. 17) and has the effect of holding the flange 71 flat up against the solder initially in a vertical position and as seaming rolls 151, 153 are approached, inclined in the direction the seam is being bent down, thus insuring that the roll 153 will underseam. With this construction is used an L-shaped backing 26 attached to the mandrel. This insures exact location of the seam on the mandrel.

In Figs. 19 and 20 is shown another modification in which a narrower strip of solder is led into position between the flanges 69, 71, without its being first put into an S-shape and without its subsequently being put into an S-shape. In this modification the guide rolls 141, 143 (as in the preferred form) draw over or gather in the material of legs 79, 81 of the U-shape, and position them as shown in Fig. 19, the juxtaposed elements then traveling through guides 165, 26 while the strip of solder 169 is fed therebetween from the roll of solder 127. Thereafter the strip 25 with the flat strip of solder applied thereto passes to the double seaming rolls 151, 153, as was the case in the preferred form.

Ninth and tenth sealing and re-forming operations

Referring to the machine in general, it will be seen that the double seamed but unsealed and elliptically formed strip passes from the double seaming rolls 151, 153 in a position surrounding or jacketing the mandrel. Thereafter the tubing is engaged by a conical roller 171 (Figs. 2 and 21) which is preferably displaced slightly off center with respect to the mandrel 109 and further depresses and overlays the now closed but unsealed seam. From this conical roll 171 the strip passes over the mandrel to a flat roll 173 (Figs. 2 and 23). The reaction for the compressing action of the rolls 171, 173 is provided by the idling supporting roll 175 (Figs. 2 and 22).

Between the compressing rolls 171, 173 is located a burner 177 which is supplied fuel from a suitable line 179 and directs its flame down upon the seam of the now formed tube. It is preferable that the burner opening or openings be ranged longitudinally of the seam, in order to effect gradual heating.

If it be desired, a burner may also be located beneath the mandrel for directing flame upwardly against the bottom of the tube. The lower burner is for annealing purposes for taking stresses out of the tubing, which stresses may have been set up during passage through this machine or prior to this passage.

The upper burner 177 has for its function the melting of the solder and some annealing is afforded with some materials, for example, copper. Alternative means for melting the solder may be used, such as an electrically heated iron or roller bearing upon the seam.

It will be appreciated that as the now formed seam with the melted solder therein passes under the last compression roll 173, that the solder is squeezed into all the cavities in the seam, so that the homogeneous mass of solder makes connections between all faces at all points. Also, the thinness of the metal of the tubing (of the order of a few thousandths of an inch as hereinbefore disclosed) insures that the roll pressure juxtaposes tubing metal about the sealing material to prevent leakage under the pressure. The S-shaped form of the solder results in the chances for leakage being greatly decreased. The chances for leakage are decreased at a rate greater than that which would be expected by merely tripling the area of sealing, for the reason given above in this paragraph. Annealing may be accomplished by passing the tube on the mandrel through a suitable heated muffle. Sometimes it is desirable to change the form of the tube from its shape on the mandrel 111. Therefore, from the last compression roll 173, the tube, which is now passing along the fingers 117 of the mandrel, is made to pass between a pair of cooperating rubber rolls 181 mounted on one to one geared shafts 183. The lower one of said shafts has a chain gear drive 185 with said shaft 119.

The function of the rubber rolls 181 is to shape the tube to a new and final shape (if desired) as it passes from the end of the mandrel 109. For instance, in Figs. 2, 24, 25 and 26, the mandrel is shaped with the fingers 117 which reach between the rolls 181, a fillet plate 118 being used to brace said fingers. The rolls in tending to conform to the shape of the end of the mandrel compress the then flexible copper material to that general shape. Figs. 24, 27 and 28 illustrate this; wherein the rubber rolls receive the tube from the elliptically shaped horn 115 of the mandrel and change its elliptical shape thus attained to the flat shape of Fig. 28, said shape having bulbous edges.

In Figs. 29 and 30 is shown another form of mandrel in which the elliptical portion thereof is extended by means of a flat, spatula shaped portion 189. In this case the elliptical form of Fig. 31 is changed into the flat form of Fig. 32 by the action of the compressing rubber rolls 181 against the flat extension 189. It will be understood that the thickness of the fingers 117 or spatula 189 may be increased so as to form any degree of effect on the tubing.

For clarity, the preliminary compression by the roll 171, the heating and the final compression by roll 173 is referred to herein as the ninth or sealing operation.

Also, the reshaping action of the rubber rolls 181 is referred to herein as the tenth or re-forming operation. It is to be understood that this re-forming may be done prior to the application of heat.

*Operation*

The sequence of operations is as follows:

The strip of material is drawn from the supply roll 23, because of the tractive action of rolls 49, 77 and later of rolls 107, 123 which have a frictional contact with the bottom surface of the copper strip. From the supply roll 23 the now flat strip is fed over the lower guide roll 31 and then back over the cutting roll 33 where it is edge trimmed by the cutters 35 (first operation); from whence it passes between the guide roll flanges 41, through the flanging plates 45 (second operation), and thence to the bulging rolls 49 (third operation). From the bulging rolls the bulged and flanged strip passes between, then descends below the converging curling plates 73, whereby the previously lateral portions of the strip are curled up to form the flanged legs 79, 81 of a U-shape (fourth operation). From the fourth or curling operation the U-shaped length of material passes through the forming rolls 77 which by their rolling action insure that the generally U-shape which the material has assumed gradually will be maintained. The reason for not taking the material directly from the bulging rolls to the forming rolls, without interposition of the curling plates 73, is that said plates permit of a gradual flow of the material from one shape to another without setting up excessive stresses and strains. The use of the flat, converging plates 73 also maintains the proper shapes at various longitudinal points. One important point here, is that the space between the plates 73 is entirely open and has no bottom or trough to which the strip 25 is made to conform in shape. This means that the strip 25 in passing from the bulging rolls 49 to the forming rolls 77 is guided by the plates 73 by contact with the edges 69 and 71. The present improvement permits each class of material to flow into a natural conformation before reaching the rolls 77. Hence undesirable crinkling and the like is eliminated, in material of variable characteristics.

From the forming rolls 77 the U-shaped material passes through the fifth or fluxing operation. At the same time the legs 79, 81 of the U-shape are being drawn together and folded over the mandrel by the gathering action of the guide rolls 141, 143.

The folding over action leads the flanges 69, 71 through the shoe 125 where the solder applying or sixth operation is carried on in the manner above described.

The next or seventh operation is the partial closing effected by the rolls 141, 143, whereby the condition illustrated in Fig. 15 is effected.

Next the eighth or double-seaming operation is carried out by the double-seaming rolls 151, 153. It may be noted that during the sixth, seventh and eighth operations, the tractive effort is applied to the strip of material by the traction rolls 107, 123.

After leaving the double seaming rolls 151, 153, the now formed tube is sent through the conical precompressing roll 171, heater 177 and final compressing roll 173. This comprises the ninth or sealing operation. If the annealing feature is to be used, it will be included in this operation.

Finally, the tube passes through the rubber forming rolls 181 for the final and tenth or tube-forming operation.

It will be understood that inasmuch as the tube is thin, its heat capacity is low and that it will ordinarily lose the high temperature attained under the torch 177 before the rubber rolls 181 are reached, particularly if these are spaced some distance from the torch. If this be not true for higher speeds of operation and/or the use of material of high specific heat, then a suitable cooling blast or bath device may be interposed between the final rolling and sealing and the final forming operations.

Alternative tube forms

In Fig. 33 is shown an alternative form of compressing roll 191 upon which is formed a bead 193 adapted, not only to compress the bead but depress it level with or below the general outside surface of the tube. It will be understood that a corresponding depression 195 should be left in the mandrel used.

In Figs. 34 to 36 is shown a method of manipulating the tube preferably after it leaves the eighth operation and before it passes under the torch, in which two brackets 197, 199 are used for supporting pairs of rolls 201, 203 respectively, the latter pair being located at an angle which is different from that of the former pair. As indicated at numeral 205 the angles for each pair are adjustable. The juxtaposed rolls 201 and 203 of the pairs are both of the concave type thereby leaving a more or less elliptical opening therebetween through which the tubing is constrained to pass, and the mandrel 109 may be curved or twisted to pass through these openings and function as a support for the tubing. The shape of this opening and of the mandrel depend upon the shape of the tubing desired as it leaves the path of the machine above described. It will be understood in this connection that the forming rolls 181 used after the sealing operation may be entirely eliminated.

From the above it will be seen that the tubing in passing through the angularly placed rolls 201, 203 is given a helical shape. If the center of the helix is to be substantially at the center of the tube, then the centers 207 of the spaces between pairs of rolls 201, 203 should remain relatively fixed within the spaces between rollers when adjustments are made.

In Figs. 37 to 40 is illustrated a modification in which the final form of the tube is helicoidal, the axis of the helicoid being outside of the tube section. This tube is illustrated at T in Fig. 51. In order to accomplish this the brackets 197, 198 are so set that the centers 207 are outside of the sectional shapes between rolls. The shape 209 in Fig. 39 is in the upper left-hand quadrant, and the same shape 209 in Fig. 40 is in the lower left-hand quadrant, the change being effected by offsetting the rolls 203 in Fig. 40 from the position of the rolls 201 in Fig. 39.

The pans of rolls 201, 203, 207 and 209 are preferably composed of rubber and run at such peripheral speed as to keep the tubing in tension.

Another method for making the issuing tubing helical is to make the mandrel 109 of helical or curved shape ahead of the roll 181. In this event, the elements cooperating with the material on the mandrel should be angularly adjusted to effect the functions hereinbefore described.

In Fig. 41 is shown a modification of the invention, wherein the tube is crimped or corrugated laterally as it issues from the mandrel. The mandrel is indicated at numeral 109, and the formed tubing at 25 and the final forming rolls at 211. These forming rolls are of different diameter but have functions similar to the functions herein described for final forming rolls. After the tube issues from the machine, it enters an added set of crimping rolls 213. These rolls have peripheries which are fluted to provide the desired crimp. The flutes reach across the grooves 215 (see Fig. 42), said grooves having the general curvature of the more or less elliptical tube. It will be understood that in this instance the mandrel preferably has a shape at the end which is flat rather than elliptical or bulbous. It is clear that the crimping may be effected angularly on the tube by using angularly formed flutes on the rolls 213.

In Figs. 43 and 44 is shown a modification in which double seaming is accomplished without feeding a strip of solder into the seam as the seam is formed. In this modification the sealing material comprises a wire 217, preferably a round cross section, which is fed from a spool 219 into position next to the seam and within the recess inherently existing along the seam before it is compressed. The moving strip 25 with its length of solder 217 then moves under a flux applying brush 219 and thence to a hot soldering iron 221.

The soldering iron 221 may be electrically or otherwise heated. It will be understood that in this modified form, the operation described and shown in Figs. 43 and 44 corresponds to the ninth or heating operation of the preferred form. Compressing rolls corresponding to the rolls 171, 173 are preferably used in connection with this soldering method. It will be understood that in this form of the invention solder is applied externally of the joint rather than internally as hereinbefore described.

The tubing that may be formed by means of this machine may have walls which are pervious or impervious to liquids and gases. The impervious form has been described. The pervious form (Fig. 45) would be manufactured in a manner such as described above, but the strip used for raw material would be formed with openings, perforations or formations 223, so distributed as to leave edges 225 adapted to constitute the seam material after the strip is curled and seamed. It will be understood that in this modification the soldering is not for the purpose of sealing but for the purpose of mechanical strength and assurance of integrity of the seam.

It is for this perforated form of metal strip that the sealing method shown and described in connection with Figs. 43 and 44 is preferably to be used, because in the case of perforated metal strip the sealing function of the solder is not as important as the mechanical strength with which it provides the seam. It will be understood that the perforating may be carried on prior to application of the raw material to the present machine; or it may be effected in the present machine, preferably before it enters the second or flanging operation.

Adjustments

The machine is provided with ample means for providing perfect adjustments and smooth operation. The speed change device 7 permits of adjusting speed to a magnitude which is best suited to the coordination of parts, whatever that may be with a given material. A main hand control wheel 8 on the main shaft 13 permits manual operation for purposes of effecting adjustments. In Figs. 1, 2 and 3 are shown adjusting wheels 10 (Figs. 1 and 2) operative on rods 12 running crosswise of the machine under the traction rolls 107, 123. On the other side of the machine (Fig. 3) said rods 12 are fastened to sector shaped adjusting cams 14 in the slots 16 of which ride pins 18. The pins 18 form extensions from blocks 20 which carry shafts 97 and 119. Corresponding adjusting elements are located oppositely on the machine. Thus there is provided means for adjusting the compression on the tubing of the traction rolls.

Other adjustments have been referred to hereinbefore, such as the adjustable feature for the angularity of rolls 77, that for height and degree of convergence of the curling plates 73. All of the rolls 141, 143, 151, 153 are mounted for adjustment (see numeral 22, Fig. 2), the roll 151, being furthermore angularly adjustable as shown at numeral 24.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

We claim:

1. A method of manufacturing light tubing of a thickness of the order of a few thousandths of an inch comprising moving a strip of material, flanging the edges of said material, curling the material so that the flanged edges are juxtaposed, applying a strip of non-liquid metal sealing material between the juxtaposed edges, joining said flanged edges as a seam so as to substantially enclose the sealing material after the interposed seaming material has been applied and heating the seam to cause the sealing material to melt and to effect a seal without escaping.

2. A method of manufacturing tubing of the order of a few thousandths of an inch wall thickness comprising moving a strip of material, flanging the edges of said material, curling the material so that the flanged edges are juxtaposed, applying a doubled back strip of non-liquid metal sealing material between the juxtaposed edges, joining said flanged edges as a seam while the interposed seaming material is cold and heating and pressing the seam to cause the sealing material to be trapped and to effect an internal seal.

3. A method of manufacturing tubing of the order of a few thousandths of an inch wall thickness comprising moving a strip of material, flanging the edges of said material, curling the material so that the flanged edges are juxtaposed, applying a doubled back strip of non-liquid metal sealing means between the juxtaposed edges, double-seaming said edges with the sealing material therein primarily flatwise with respect to the tube wall and subsequently melting said sealing material in the double seam.

4. A method of manufacturing tubing of the order of a few thousandths of an inch wall thickness comprising moving a strip of material, flanging the edges of said material, curling the material so that the flanged edges are juxtaposed, applying a double back strip of sealing material between the juxtaposed edges, double-seaming said edges with the sealing material therein primarily flatwise with respect to the tube wall, and subsequently melting said sealing material in the double seam and compressing the seam as said material solidifies to ensure entrapment of the same by further compressing the wall material and to ensure homogeneity.

5. The method of manufacturing tubing of the order of a few thousandths of an inch wall thickness comprising moving a strip of material, flanging the edges of said material, curling the material so that the flanged edges are juxtaposed, applying a strip of non-liquid metal sealing material between the juxtaposed edges, joining said flanged edges as a seam while the interposed sealing material is cold, pre-rolling the seam thus formed to enclose the sealing material, heating the seam to melt said sealing material and subsequently rolling the seam.

6. The method of forming tubing comprising moving a strip of material, flanging said material, curling the strip to juxtapose said flanges, applying a strip of non-liquid sealing material as said flanges are juxtaposed, forming the strip of sealing material as it is applied so that it assumes an S-shape therebetween substantially completely enclosing the material in the seam and subsequently heating the seam to cause said sealing material to effect a seal within said seam.

7. The method of forming tubing comprising moving a strip of material, flanging said material, curling the strip to juxtapose said flanges, applying a strip of sealing material as said flanges are juxtaposed, forming the strip of sealing material as it is applied so that it assumes an S-shape therebetween substantially enclosing the cooling material in the seam, and subsequently heating the seam to cause said sealing material to effect a seal within said seam.

8. In a tube-forming machine, a mandrel, means for guiding a strip of material toward said mandrel, curling means including in said guiding means, curling taking effect over said mandrel, means for forming a seam as the material curls over said mandrel, resiliently surfaced traction means pressing against the material and reacting against the mandrel to draw the material over the mandrel and forming rolls engaging the seamed material on the mandrel to provide a predetermined shape of the same as said material leaves the mandrel.

9. In a tube-forming machine, a mandrel, means for guiding a strip of material toward said mandrel, curling means included in said guiding means, curling taking effect over said mandrel, means for forming a seam as the material curls over said mandrel, means for simultaneously placing a length of solder in the seam, means associated with the mandrel for melting the solder in the seam and compressing said seam with the solder therein, pressure traction means pressing against the material and reacting against the mandrel to draw the material over the mandrel, and forming rolls engaging the seamed material on the mandrel to provide a predetermined shape of the same as said material leaves the mandrel.

10. In tube-making apparatus a mandrel, means for curling a strip over said mandrel, means for moving the strip, means for applying a length of solder to the strip as it is curled over the mandrel, means for forming a seam after the solder is applied, means for pre-rolling said seam after it has been made and the solder applied, to substantially enclose the solder, means for heating the seam after it has been pre-rolled and means for finally rolling the seam after heating thereof.

11. In tube-making apparatus a mandrel, means for curling a strip over said mandrel, means for moving the strip, means for applying a length of solder to the strip as it is curled over the mandrel, means for forming a seam after the solder is applied, means for pre-rolling said seam after it has been made and the solder applied to substantially enclose the solder, means for heating the seam after it has been pre-rolled, means for finally rolling the seam after heating thereof and means for finally shaping the resulting seamed tube to the shape of the mandrel.

12. In a tube-making machine, means for supporting a supply of strip material, means for drawing said material through a trimming cutter, means for flanging said strip, means for bulging the same, means for curling the flanged and bulged strip to form a flanged U-shape, means for applying flux to the flanges of said U-shape, means for juxtaposing said flanges, means for applying a strip of solder to the flanges as they are juxtaposed, said solder being formed to be interposed between juxtaposed faces of the flanges as said flanges are brought together, traction means located so as to draw the strip through the elements of the machine above described, means on the delivery side of said traction means for seaming, prerolling the seams, heating the same, re-rolling the same and re-forming the resulting tubing as it is delivered from the machine.

13. In tube-making apparatus a mandrel, means for curling a strip over said mandrel, means for moving the strip, means for applying a length of solder to the strip as it is curled over the mandrel, means for forming a seam after the solder is applied, means for pre-rolling said seam after it has been made and the solder applied, means for heating the seam after it has been pre-rolled, means for finally rolling the seam after heating thereof, means for subsequently reforming the tube and means for finally corrugating the same.

PHILIP H. CHASE.
JOHN R. FALCONER.
WILLIAM O. CUNNINGHAM.